United States Patent
Zhou et al.

(10) Patent No.: US 11,983,631 B1
(45) Date of Patent: May 14, 2024

(54) CUBIC REGULARIZATION OPTIMIZER

(71) Applicant: SAS Institute Inc., Cary, NC (US)

(72) Inventors: Wenwen Zhou, Cary, NC (US); Joshua David Griffin, Harrisburg, NC (US); Riadh Omheni, Raleigh, NC (US); Seyedalireza Yektamaram, Rotterdam (NL); Yan Xu, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/511,092

(22) Filed: Nov. 16, 2023

Related U.S. Application Data

(60) Provisional application No. 63/522,378, filed on Jun. 21, 2023, provisional application No. 63/469,090, filed on May 26, 2023.

(51) Int. Cl.
*G06N 3/08* (2023.01)
*G06F 17/16* (2006.01)

(52) U.S. Cl.
CPC ............... *G06N 3/08* (2013.01); *G06F 17/16* (2013.01)

(58) Field of Classification Search
CPC .................................. G06N 3/08; G06F 17/16
USPC ......................................................... 708/207
See application file for complete search history.

(56) References Cited

U.S. PATENT DOCUMENTS

| | | | |
|---|---|---|---|
| 11,120,072 B1* | 9/2021 | Shen | ................... G06F 18/2411 |
| 11,727,274 B1 | 8/2023 | Forristal et al. | |
| 2020/0082267 A1* | 3/2020 | Yamazato | ................ G06N 3/08 |
| 2020/0285956 A1* | 9/2020 | Bouchard | ............... G06F 17/16 |

OTHER PUBLICATIONS

Tomanos, Dimitri, "Algorithms and software for multilevel nonlinear optimization", 191 pages, http://hdl.handle.net/2078.2/24975 (Year: 2009).*

Hodel, A. Scottedward, And Pradeep Misra. "Partial Pivoting In The Computation Of Krylov Subspaces Of Large Sparse Systems." *42nd Ieee International Conference On Decision And Control (Ieee Cat. No. 03ch37475)*. vol. 3. Ieee 2003.

(Continued)

*Primary Examiner* — Tan V Mai
(74) *Attorney, Agent, or Firm* — Bell & Manning, LLC

(57) ABSTRACT

A computer determines a solution to a nonlinear optimization problem. A conjugate gradient (CG) iteration is performed with a first order derivative vector and a second order derivative matrix to update a CG residual vector, an H-conjugate vector, and a residual weight vector. A CG solution vector is updated using a previous CG solution vector, the H-conjugate vector, and the residual weight vector. An eigenvector of the second order derivative matrix having a smallest eigenvalue is computed. A basis matrix is defined that includes a cubic regularization (CR) solution vector, a CR residual vector, the CG solution vector, the CG residual vector, and the eigenvector. A CR iteration is performed to update the CR solution vector. The CR residual vector is updated using the first order derivative vector, the second order derivative matrix, and the updated CR solution vector. The process is repeated until a stop criterion is satisfied.

30 Claims, 7 Drawing Sheets

(56) References Cited

OTHER PUBLICATIONS

Davis, Timothy A., And Yifan Hu. "The University Of Florida Sparse Matrix Collection." *Acm Transactions On Mathematical Software (Toms)* 38.1 (2011): 1-25.
I. G. Akrotirianakis, M. Gratton, J. D. Griffin, S. Yektamaram & W. Zhou (2022). Simultaneous iterative solutions for the trust-region and minimum eigenvalue subproblem. *Optimization Methods and Software*, 37(2), 692-711.
Gene H. Golub And Charles F. Van Loan, Chapter 9. Matrix Computations, The Johns Hopkins University Press, Baltimore, Maryland, Third Ed., 1996.
Stathopoulos, Andreas, And Konstantinos Orginos, "Computing And Deflating Eigenvalues While Solving Multiple Right-Hand Side Linear Systems With An Application To Quantum Chromodynamics." *SIAM Journal On Scientific Computing* 32.1 (2010): 439-462.
Anonymous Authors "A Novel Fast Exact Subproblem Solver For Stochastic Quasi-Newton Cubic Regularized Optimization." *Conference Paper ICLR 2023*.
A Stathopoulos et al. 2009 J. Phys.: Conf. Ser. 180 012073.
Cartis, Coralia, Nicholas IM Gould, and Philippe L. Toint. "Adaptive cubic regularisation methods for unconstrained optimization. Part I: motivation, convergence and numerical results." *Mathematical Programming* Ser. A 127:245-295 (2011).
Hager, William, and Soonchul Park. "Global convergence of SSM for minimizing a quadratic over a sphere." *Mathematics of Computation* 74.251 (2005): 1413-1423.
In SAS/STAT 13.1 User's Guide Introduction to Mixed Modeling Procedures. Chapter 6. Introduction to Mixed Modeling Procedures. 2013. SAS Institute Inc.
Erway, J. B., & Gill, P. E. An interior-point subspace minimization method for the trust-region step. 2009.
SAS/STAT 15.2 User's Guide, The Logistic Procedure. SAS Institute Inc. Nov. 6, 2020.
SAS/ETS 15.1 User's Guide. The Varmax Procedure. SAS Institute Inc. 2018.
Singular value decomposition. Wikipedia. Printed on Oct. 30, 2023.
Gould, Nicholas IM, Stefano Lucidi, Massimo Roma, and Philippe L. Toint. "Solving the trust-region subproblem using the Lanczos method." *SIAM Journal on Optimization* 9, No. 2 (1999): 504-525.
SAS/ETS 13.2 User's Guide. The SSM Procedure. SAS Institute Inc, 2014.

\* cited by examiner

CUBIC REGULARIZATION OPTIMIZER

CROSS-REFERENCE TO RELATED APPLICATIONS

The present application claims the benefit of and priority to 35 U.S.C. § 119(e) to U.S. Provisional Patent Application No. 63/469,090 filed May 26, 2023 and to U.S. Provisional Patent Application No. 63/522,378 filed Jun. 21, 2023, the entire contents of which are hereby incorporated by reference.

BACKGROUND

Optimization methods may determine an optimum solution given a first and a second order derivative. For example, in training a neural network, a gradient and a Hessian may be the first and a second order derivatives, respectively, for which an optimum solution is found using an optimization method. A cubic term can be added to a regularized quadratic problem to ensure a descent search direction that improves the function being optimized. A reliable and efficient global minimum solver is a challenge, however, because the addition of the cubic term forms a non-convex optimization problem.

SUMMARY

In an example embodiment, a computer-readable medium is provided having stored thereon computer-readable instructions that when executed by a computing device, cause the computing device to determine a solution to a nonlinear optimization problem. (A) A conjugate gradient (CG) iteration is performed with a predefined first order derivative vector and a predefined second order derivative matrix. Performance of the conjugate gradient iteration updates a CG residual vector, an H-conjugate vector, and a residual weight vector. (B) A CG solution vector is updated using a previous CG solution vector, the updated H-conjugate vector, and the updated residual weight vector. (C) An eigenvector of the predefined second order derivative matrix that has a smallest eigenvalue relative to other eigenvalues of other eigenvectors is computed. (D) A basis matrix is defined that includes a previous cubic regularization (CR) solution vector, a previous CR residual vector, the updated CG solution vector, the updated CG residual vector, and the computed eigenvector. (E) A CR iteration is performed to update the previous CR solution vector. (F) The previous CR residual vector is updated using the predefined first order derivative vector, the predefined second order derivative matrix, and the updated previous CR solution vector. (G) (A) through (F) are repeated until a stop criterion is satisfied, wherein, on a next iteration of (A) through (F), the previous CG solution vector is the updated CG solution vector, the previous CR residual vector is the updated previous CR residual vector, and the previous CR solution vector is the updated previous CR solution vector. The updated previous CR solution vector is output for use in solving a nonlinear optimization problem.

In another example embodiment, a computing device is provided. The computing device includes, but is not limited to, a processor and a computer-readable medium operably coupled to the processor. The computer-readable medium has instructions stored thereon that, when executed by the processor, cause the computing device to determine a solution to a nonlinear optimization problem.

In yet another example embodiment, a method of determining a solution to a nonlinear optimization problem is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
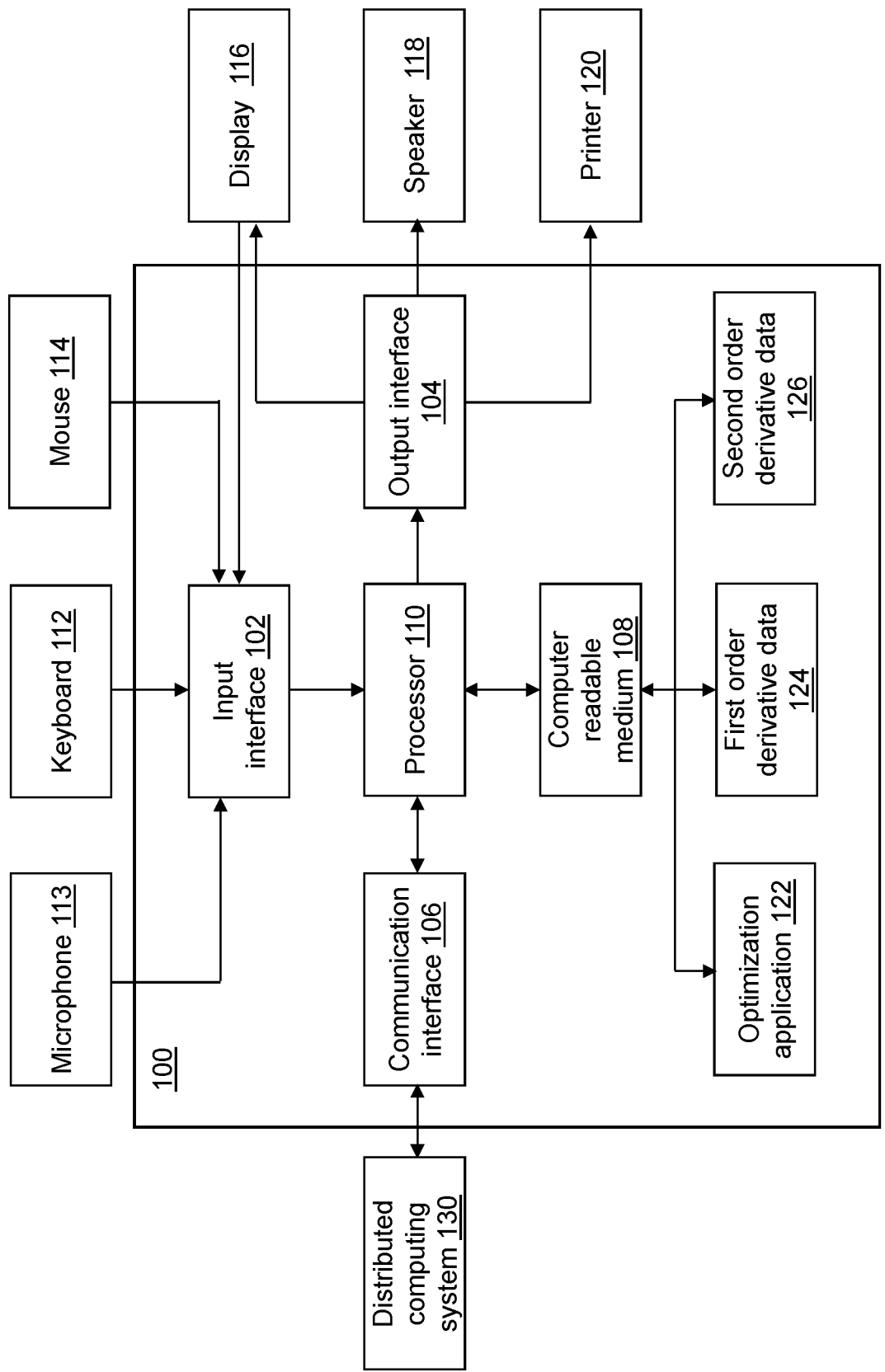
FIG. 1 depicts a block diagram of an optimization device in accordance with an illustrative embodiment.

Neural networks are a class of machine learning models that consist of one or more transformation layers. Loosely speaking, each layer inputs a set of weights denoted by the matrix $W \in \mathbb{R}^{h \times n}$ a set of neurons $x \in \mathbb{R}^n$, and a bias term $\tau \in \mathbb{R}^h$. The set of weights are the neural network parameters. The corresponding output of the layer is itself a set of neurons $\alpha(x) \in \mathbb{R}^h$ defined by the transformation:

$$a(x) = \theta(Wx + \tau),$$

where $\theta$ denotes the corresponding activation function. If there are a layers and the set of pairs $(W, \tau)$ is indexed by a corresponding layer index, the union of the set of parameters $\cup \{W_i, \tau_i\}_{i=1}^{\alpha}$ becomes corresponding optimization variables or parameters. For simplicity, a map from this set to a weight vector $w \in \mathbb{R}^n$ is assumed, where n corresponds to a total number of neurons across all layers.

Deep learning models are a class of neural networks consisting of many layers. As in other machine learning approaches, in deep learning, a loss function is minimized $$\min_{w \in \mathbb{R}^n} f(w) = \frac{1}{N} \sum_{i=1}^{N} f_i(w; x_i, t_i),$$

where each $f_i(w)$ provides a measure of accuracy for the deep learning model applied to the $i^{th}$ observation in a training dataset which consists of N observations, $x_i$ indicates an observation vector, and $\tau_i$ indicates a target variable. $f_i(w)$ may be described as a loss or objective function. The class of SGD methods that create a solution sequence $\{w_l\}$, where l indicates a neural network training iteration number, using only stochastic first-order approximations defined simply as $w_1 = w_l - \alpha_l \nabla f_l(w_l)$ are commonly used where $\alpha_l$ is a control parameter called the learning rate. Gradient descent optimizations follow a direction of a slope of the surface created by the objective function downhill until a valley or saddle point is reached.

Cubic regularization (CR) is an alternative that minimizes a regularized quadratic problem with an added cubic term to ensure a descent search direction to improve $f(w)$ at $w_l$, that is, $$\min_{s \in \mathbb{R}^n} \psi_l(s) = g_l^T s + \frac{1}{2} s^T H_l s + \frac{1}{3} \sigma_l \|s\|^3, \quad (1)$$

where $s_l = w_l - w_{l-1}$ is a step or direction vector, $\psi_l$ indicates the cubic model, $f(w)$ is an objective function to minimize, T indicates a transpose, $g_l$ is a gradient vector where $g_l = \nabla f(w_l)$, $H_l$ is a Hessian matrix where $H_l = \nabla^2 f(w_l)$, $\sigma_l$ is a regularization parameter, and $\|\ \|$ indicates a Euclidean norm computation.

From a trust region problem, $$\min_{s \in \mathbb{R}^n} m(s) = g_l^T s + \frac{1}{2} s^T H_l s \quad (2)$$

subject to $\|s\|_2 \le \Delta$

Solving equation (2) is equivalent to solving equation (1) when the optimal solution s* from (1) is found, and $\Delta = \|s^*\|$.

An optimization application 122 solves the cubic regularization problem for large scale problems as described further below as part of determining a solution to a nonlinear optimization problem. For example, training a neural network includes computation of a search direction vector each step. Computation of the search direction vector is a nonlinear optimization problem. As additional examples, SAS Procedures such as GLM, GLIMMIX, HPMIXED, MIXED, NESTED, NLMIXED, VARCOMP, LOGISTIC, SSM, and VARMAX can use the method performed by optimization application 122 to estimate parameters by maximizing a likelihood function. For example, the GLM, GLIMMIX, HPMIXED, MIXED, NESTED, NLMIXED and VARCOMP procedures are used to compute a mixed model that includes fixed and random effects. As another example, the LOGISTIC procedure is used to perform a logistic regression to determine a relationship between response variable values and explanatory variable values. Again, a search direction vector is determined each step using optimization application 122 to improve the log-likelihood function along the determined direction to eventually maximize the log-likelihood function. As still another example, the SSM procedure is used to compute a state space model by analyzing continuous response variables recorded sequentially. As still another example, the VARMAX procedure is used to compute model parameters and generate forecasts that are associated with vector autoregressive moving average processes with exogenous regressors.

Optimization application 122 includes two components: 1) a sequential subspace process that performs subspace minimization by solving a sequence of small subspace problems iteratively to reduce the cubic objective function, and 2) a conjugate gradient process that generates the vectors used to construct the bases of the subspaces. Numerical results provided below demonstrate the effectiveness of optimization application 122 in comparison to existing methods. Optimization application 122 provides an iterative algorithm that does not use direct matrix factorization. The main computation cost of optimization application 122 is matrix vector multiplication.

Referring to FIG. 1, a block diagram of an optimization device 100 is shown in accordance with an illustrative embodiment. Optimization device 100 may include an input interface 102, an output interface 104, a communication interface 106, a non-transitory computer-readable medium 108, a processor 110, and optimization application 122. Fewer, different, and/or additional components may be incorporated into optimization device 100.

Input interface 102 provides an interface for receiving information from the user or another device for entry into optimization device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into optimization device 100 or to make selections presented in a user interface displayed on display 116.

The same interface may support both input interface 102 and output interface 104. For example, display 116 comprising a touch screen provides a mechanism for user input and for presentation of output to the user. Optimization device 100 may have one or more input interfaces that use the same or a different input interface technology. The input interface technology further may be accessible by optimization device 100 through communication interface 106.

Output interface 104 provides an interface for outputting information for review by a user of optimization device 100 and/or for use by another application or device. For example, output interface 104 may interface with various output technologies including, but not limited to, display 116, a speaker 118, a printer 120, etc. Optimization device 100 may have one or more output interfaces that use the same or a different output interface technology. The output interface technology further may be accessible by optimization device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Optimization device 100 may have one or more communication interfaces that use the same or a different communication interface technology. For example, optimization device 100 may support communication using an Ethernet port, a Bluetooth® antenna, a telephone jack, a USB port, etc. Data and/or messages may be transferred between optimization device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Optimization device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Optimization device 100 also may have one or more drives that support the loading of a memory media such as a CD, DVD, an external hard drive, etc. One or more external hard drives further may be connected to optimization device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or other software tool or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Optimization device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Optimization application 122 performs operations associated with defining an optimal solution given a first order derivative vector and a second order derivative matrix. Some or all of the operations described herein may be embodied in optimization application 122. The operations may be implemented using hardware, firmware, software, or any combination of these methods.

Referring to the example embodiment of FIG. 1, optimization application 122 is implemented in software (comprised of computer-readable and/or computer-executable instructions) stored in computer-readable medium 108 and accessible by processor 110 for execution of the instructions that embody the operations of optimization application 122. Optimization application 122 may be written using one or more programming languages, assembly languages, scripting languages, etc. Optimization application 122 may be integrated with other analytic tools. As an example, optimization application 122 may be part of an integrated data analytics software application and/or software architecture such as that offered by SAS Institute Inc. of Cary, North Carolina, USA. Merely for illustration, optimization application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, North Carolina, USA. Data mining, statistical analytics, and response prediction are practically applied in a wide variety of industries to solve technical problems.

Optimization application 122 may be implemented as a Web application. For example, optimization application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Figure 2A:
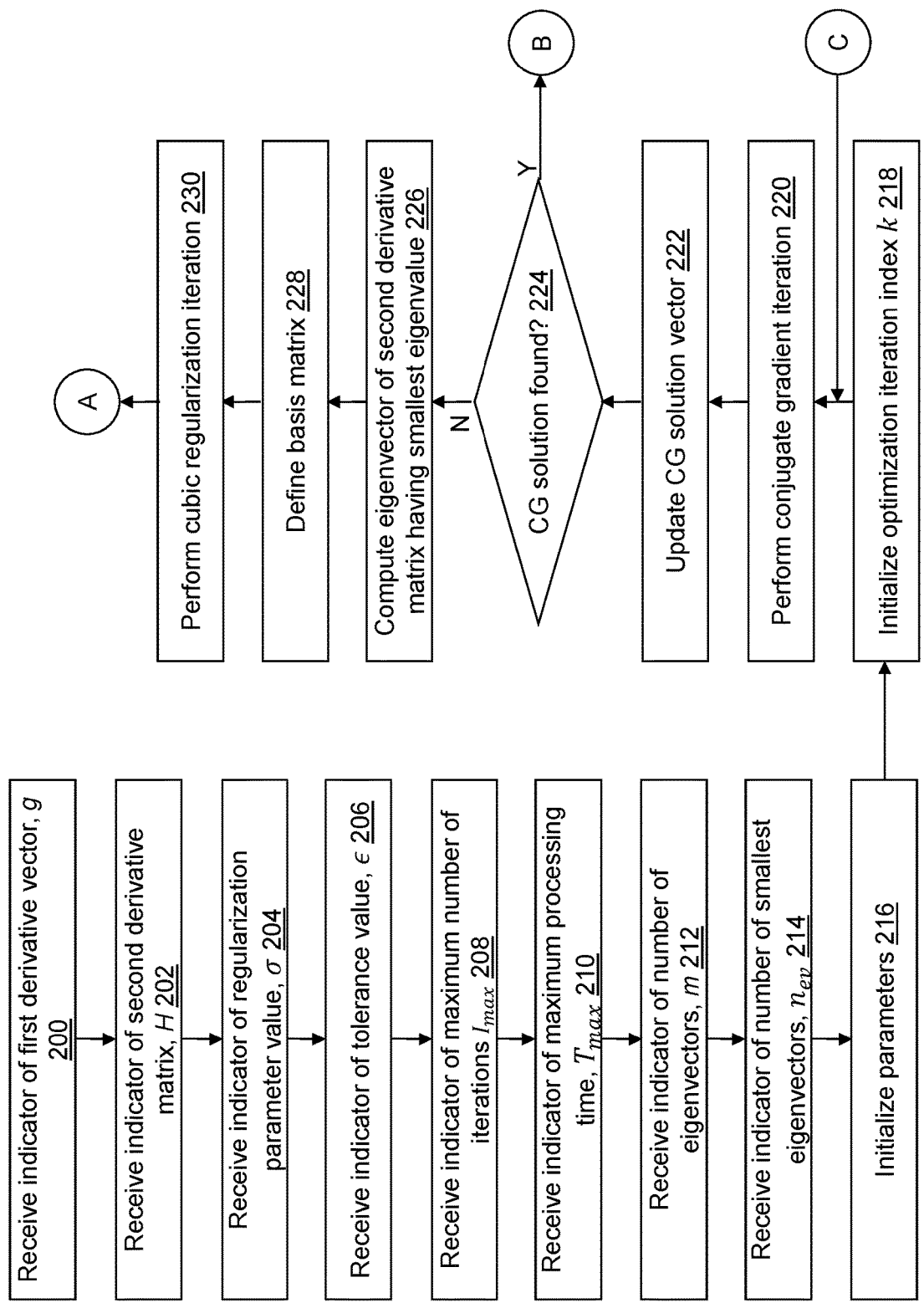
FIGS. 2A and 2B depict a flow diagram illustrating examples of operations performed by an optimization application of the optimization device of FIG. 1 in accordance with an illustrative embodiment.
Figure 2B:
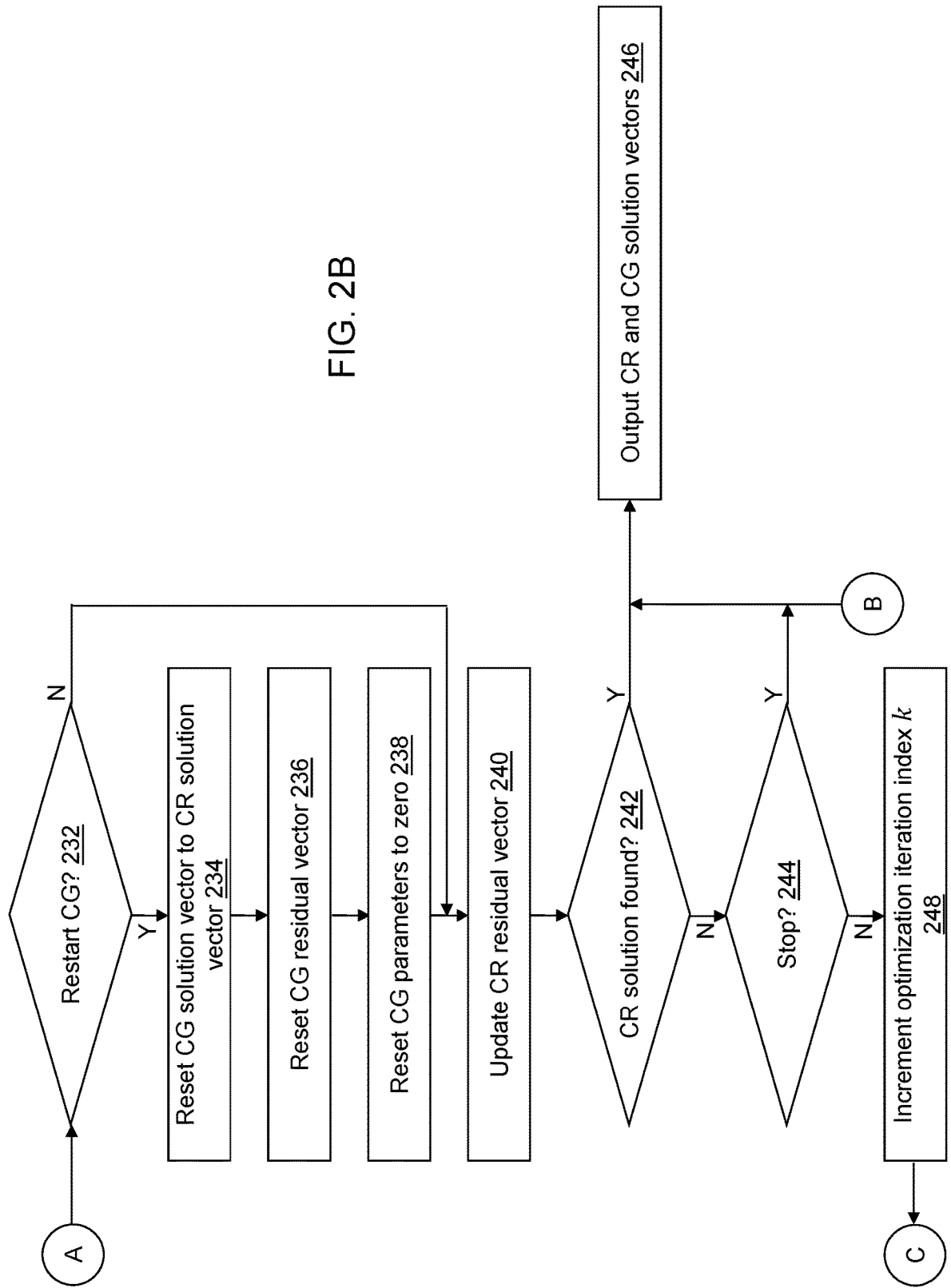

Referring to FIGS. 2A and 2B example operations associated with optimization application 122 are described. Additional, fewer, or different operations may be performed depending on the embodiment of optimization application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute optimization application 122, which causes presentation of a first user interface window, which may include a plurality of menus and selectors such as drop-down menus, buttons, text boxes, hyperlinks, etc. associated with optimization application 122 as understood by a person of skill in the art. The plurality of menus and selectors may be accessed in various orders. An indicator may indicate one or more user selections from a user interface, one or more data entries into a data field or a data window of the user interface such as a text box or a control window, one or more data items read from computer-readable medium 108, or otherwise defined with one or more default values, etc. that are received as an input by optimization application 122. The operations of optimization application 122 further may be performed in parallel using a plurality of threads and/or a plurality of worker computing devices.

Referring to FIG. 2A, in an operation 200, a first indicator may be received that indicates a first order derivative vector g such as gradient vector $g_l$ where the subscript l for the neural network training iteration number will be dropped for simplicity. The first order derivative vector g has a dimension of n that may correspond to a total number of neurons across all layers of a neural network. For example, the first indicator indicates a location and a name of first order derivative data 124. As an example, the first indicator may be received by optimization application 122 after selection from a user interface window or after entry by a user into a user interface window. In an alternative embodiment, first order derivative data 124 may not be selectable. For example, a most recently created first order derivative vector may be used automatically, for example, as part of training a neural network model.

In an operation 202, a second indicator may be received that indicates a second order derivative matrix H such as a Hessian matrix $H_l$ where the subscript l for the neural network training iteration number will be dropped for simplicity in this written description. The second order derivative matrix H has a dimension of n×n. For example, the second indicator indicates a location and a name of second order derivative data 126. As an example, the second indicator may be received by optimization application 122 after selection from a user interface window or after entry by a user into a user interface window. In an alternative embodiment, second order derivative data 126 may not be selectable. For example, a most recently created Hessian matrix may be used automatically, for example, as part of training the neural network model.

In an operation 204, a third indicator may be received that indicates a regularization parameter value σ represented as $σ_l$ in equation (1). In an alternative embodiment, the third indicator may not be received. For example, a default value may be stored, for example, in computer-readable medium 108 and used automatically. In another alternative embodiment, the value of the regularization parameter value σ may not be selectable. Instead, a fixed, predefined value may be used. For illustration, a default value of the regularization parameter value σ may be one though any value greater than zero may be used.

In an operation 206, a fourth indicator of a tolerance value E may be received. In an alternative embodiment, the fourth indicator may not be received. For example, a default value may be stored, for example, in computer-readable medium 108 and used automatically. In another alternative embodiment, the tolerance value E may not be definable. Instead, a fixed, predefined value may be used. For illustration, a default value of the tolerance value E may be 0.0001 though other values between and including zero and one may be used. The tolerance value E may be used to determine when the optimal solution determination is stopped.

In an operation 208, a fifth indicator of a maximum number of iterations $I_{max}$ may be received. The maximum number of iterations $I_{max}$ may be a first optimization stop criteria used to determine when the optimal solution determination is stopped. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 5000 though other values may be used.

In an operation 210, a sixth indicator of a maximum CPU time $T_{max}$ may be received. The maximum CPU time value $T_{max}$ may be a second optimization stop criteria used to determine when the optimal solution determination is stopped. In an alternative embodiment, the sixth indicator may not be received. For example, a default value may be stored, for example, in computer-readable medium 108 and used automatically. In another alternative embodiment, the value of the maximum CPU time $T_{max}$ may not be selectable. Instead, a fixed, predefined value may be used. For illustration, a default value of the maximum CPU time $T_{max}$ may be 3600 though other values may be used.

In an operation 212, a seventh indicator of a number of eigenvectors m may be received. The number of eigenvectors m may indicate a number of eigenvectors to maintain. In an alternative embodiment, the seventh indicator may not be received. For example, a default value may be stored, for example, in computer-readable medium 108 and used automatically. In another alternative embodiment, the value of the number of eigenvectors m may not be selectable. Instead, a fixed, predefined value may be used. For illustration, a default value of the number of eigenvectors m may be 10 though other values may be used.

In an operation 214, an eighth indicator of a number of smallest eigenvectors $n_{ev}$ may be received. The number of smallest eigenvectors $n_{ev}$ may indicate a number of smallest eigenvectors to maintain. In an alternative embodiment, the eighth indicator may not be received. For example, a default value may be stored, for example, in computer-readable medium 108 and used automatically. In another alternative embodiment, the value of the number of smallest eigenvectors $n_{ev}$ may not be selectable. Instead, a fixed, predefined value may be used. For illustration, a default value of the number of smallest eigenvectors $n_{ev}$ may be 3 though other values may be used subject to $m>2n_{ev}$.

In an operation 216, parameters are initialized. For example, $\hat{s}_0=s_0=0$, $λ=σ\|s_0\|$, $\hat{r}_0=r_0=-(g+(H+λI)s_0)$, $γ_0=0$, $p_0=0$, $α_0=0$. s indicates a CR solution vector, s indicates a conjugate gradient (CG) solution vector, r indicates a CR residual vector, r indicates a CG residual vector, and I indicates an identity matrix. λ and γ are scalar values. $s_0$, $\hat{s}_0$, $\hat{r}_0$, $r_0$, $p_0$, and $α_0$ are vectors having a dimension of n. I has the same dimension as the second order derivative matrix H.

In an operation 218, an optimization iteration index k is initialized, for example, as k=1.

In an operation 220, a CG iteration is performed using a CG process to generate the vectors to create the small dimensional subproblems for a CR process that is used to iteratively improve the objective function O(s) defined in equation (1). This is equivalent to a single iteration of a Lanczos algorithm. The CG process computes a single matrix multiply and stores the result for later use. The CG process returns bookkeeping terms used to obtain an approximation of the eigenvector of H with respect to its leftmost (smallest) eigenvalue as described further below. Pseudocode for the CG process is provided below.

$γk=\hat{r}_{k-1}^T\hat{r}_{k-1}$ if $γ_{k-1}=0$ then $β=0$ else $β=γ_k/γ_{k-1}$ end if $p_k=\hat{r}_{k-1}+βp_{k-1}$ $α_k=γ_k/(p_k^T(H+λI)p_k)$ $\hat{r}_k=\hat{r}_{k-1}-α_k(H+λI)p_k$ $q=\hat{r}_{k-1}/\sqrt{γ_k}$ if $α_{k-1}=0$ then $t_d=1/α_k$ $t_u=0$ else $t_d = 1/\alpha_k + \beta/\alpha_{k-1}$ $t_u = -\sqrt{\beta}/\alpha_{k-1}$ end if where $p_k$ indicates an H-conjugate vector, $\alpha_k$ indicates a residual weight vector associated with the residual vector $\hat{r}_{k-1}$, q indicates a Lanczos vector obtained by normalizing the residual vector, $t_u$ indicates a diagonal entry in a Lanczos tridiagonal matrix, $t_d$ indicates an off-diagonal entry in the Lanczos tridiagonal matrix. Additional details can be found in a paper by I. G. Akrotirianakis, et al., titled Simultaneous iterative solutions for the trust-region and minimum eigenvalue subproblem and published online in *Computer Science*, Optimization Methods and Software at 37:2, pages 692-711 on Oct. 1, 2022 (Akrotirianakis).

In an operation 222, the CG solution vector $s_k$ is updated for a current iteration, for example, using $\hat{s}_k = \hat{s}_{k-1} + \alpha_k p_k$.

In an operation 224, a determination is made concerning whether a CG solution has been found. When the CG solution has been found, processing continues in an operation 246 shown referring to FIG. 2B. When the CG solution has not been found, processing continues in an operation 226. For example, when $\|\hat{r}_k\| \leq 0.5 \epsilon \|g\|$ and $\|\lambda - \sigma\|\hat{s}_k\|\|\|\hat{s}_k\| \leq 0.5 \epsilon \|g\|$, a CG solution has been found.

In operation 226, an eigenvector $v_k$ of the second order derivative matrix H having a smallest eigenvalue is computed. Pseudocode to compute an approximation of the eigenvector of the second order derivative matrix H with respect to its leftmost (smallest) eigenvalue is provided below where T and Q are initially empty matrices that are expanded.

$[b,b] = \text{size}(T)$ if $b=0$ then $T_{1,1} = t_d$ else $T_{b+1,b+1} = t_d$ $T_{b,b+1} = T_{b+1,b} = t_u$ end if if $b=m$ then let $\tilde{T}$ denote $m-1$ principal submatrices of $T$ let $Y$ store eigenvectors of $n_{ev}$ smallest eigenvalues of $T$ let $\tilde{Y}$ store eigenvectors of $n_{ev}$ smallest eigenvalues of $\tilde{T}$ let $W$ denote an orthonormal basis for $(Y,[_0^{\tilde{Y}}]) \in \mathbb{R}^{m \times 2n_{ev}}$ let $E$ denote a diagonal matrix of $2n_{ev}$ eigenvalues of $W^T TW$ let $Z$ denote corresponding $2n_{ev}$ eigenvectors of $W^T TW$ set $Q \leftarrow QWZ$ where $Q \in R^{n \times 2n_{ev}}$ $T = (_q T H Q^E T_{b+1,b+1} Q^{THq})$ end if $v_k$ is vector $V$ with smallest Rayleigh Quotient of $W^T TW$ set $Q \leftarrow [Q,q]$ For the first m−1 iterations, T is identical to a corresponding Lanczos tridiagonal matrix, where the tridiagonal elements are appended to matrix T each iteration. Q contains the Lanczos vectors computed by the CG process as the normalized residuals and is an orthogonal matrix. When the T matrix has dimension m×m, an internal restart occurs that reduces the dimension of the T matrix to $(2n_{ev}+1) \times (2n_{ev}+1)$ meaning that the Q and T matrices are never larger than n×m and m×m, respectively. Additional details can be found in the Akrotirianakis paper.

In an operation 228, a basis matrix W is defined, for example, using W=basis($\{s_{k-1}, r_{k-1}, \hat{s}_k, \hat{r}_k, v_k\}$). In an alternative embodiment, the basis matrix may be defined using W=basis($\{s_{k-1}, \hat{s}_k, \hat{r}_k, v_k\}$) when $\|\hat{r}_k\| > \epsilon \|g\|$ to avoid a matrix-vector multiplication and so that the CR process is reduced along $-\hat{r}_k$. A matrix M is created by stacking the vectors $s_{k-1}, \hat{s}_k, \hat{r}_k, v_k$ or $s_{k-1}, r_{k-1}, \hat{s}_k, \hat{r}_k, v_k$ in successive columns. A singular value decomposition $M = U\Sigma V^T$ is computed from the matrix M, where U indicates a first unitary matrix having dimension of n×n, $\Sigma$ indicates a rectangular diagonal matrix that includes the singular values of M and has dimension n×4 when $\|\hat{r}_k\| > \epsilon \|g\|$ and n×5 otherwise, V indicates a second unitary matrix having dimension of 4×4 when $\|\hat{r}_k\| > \epsilon \|g\|$ and 5×5 otherwise, and T indicates a transpose. To ensure linear independence, basis indicates the orthonormal basis matrix V computed from the singular value decomposition that includes a set of orthonormal or basis vectors.

In an operation 230, a CR iteration is performed using the CR process to update the CR solution vector $s_k$, and processing continues in an operation 232 shown referring to FIG. 2B. Pseudocode for the CR process is provided below.

determine $u^*$ by minimizing in span of $W$ $$\min_u u^T(W^T g) + \frac{1}{2} u^T(W^T HW) u + \frac{1}{3} \sigma \|Wu\|^3$$

$$s_k = Wu^*$$

The subspace is spanned by the columns of W. Based on the definition in operation 228, a dimension of matrix W is n×4 or n×5 based on $\|\hat{r}_k\| \leq \epsilon \|g\|$. A method for solving for u* is described in section 6.1 of a paper titled Adaptive cubic regularisation methods for unconstrained optimization. Part I: motivation, convergence and numerical results, authored by Coralia Cartis et al. and published in *Math. Program.*, series A, volume 127 at pp. 249-295 (2011)(Cartis) that describes the adaptive regularization framework using cubics algorithm.

Referring to FIG. 2B, in operation 232, a determination is made concerning whether to restart the CG process. When the CG process is restarted, processing continues in an operation 234. When the CG process is not restarted, processing continues in an operation 240. For example, when $p_k^T(H+\lambda I)p_k \leq 0$ or when $\|\hat{r}_k\| \in \|g\|$, the CG process is restarted.

In operation 234, the CG solution vector $\hat{s}_k$ is reset to the current CR solution vector, for example, using $\hat{s}_k = s_k$.

In an operation 236, the CG residual vector $\hat{r}_k$ is reset, for example, using $\hat{r}k = -(H+\lambda I)\hat{s}k - g$.

In an operation 238, other CG parameters are reset. For example, $\gamma_k=0$, $p_k=0$, k=0, and $\lambda=\sigma\|s_k\|$.

In an operation 240, the CR residual vector $r_k$ is updated for a current iteration, for example, using $r_k=-(H+\sigma\|s_k\|I)s_k-g$.

In an operation 242, a determination is made concerning whether a CR solution has been found. When the CR solution has been found, processing continues in operation 246. When the CR solution has not been found, processing continues in an operation 244. For example, when $\|r_k\|\leq\epsilon\|g\|$, a CR solution has been found.

In operation 244, a determination is made concerning whether processing is stopped, for example, when $k\geq I_{max}$ or the CPU time exceeds $T_{max}$. When processing is stopped, processing continues in operation 246. When processing is not stopped, processing continues in an operation 248.

In operation 246, the CR solution vector $s_k$ and the CG solution vector $\hat{s}_k$ are output or provided to another process. For example, the CR solution vector $s_k$ and the CG solution vector $\hat{s}_k$ may be provided as a search direction vector solution to a process training a neural network.

In operation 248, the optimization iteration index k is incremented, for example, using k=k+1, and processing continues in operation 220 to perform another iteration.

Optimization application 122 generates two sequences of iterative solutions, $s_k$ and $\hat{s}_k$. To ensure that the CR process always improves, $s_k$ and $r_k$ are included as columns of the basis matrix W so that $\psi_f(s)$ is improved along a steepest direction $-r_k$ at the current $s_k$, $\hat{s}_k$ and $\hat{r}_k$ are included as columns of the basis matrix W to improve the CR solution as the CG process iteratively solves the approximated first order equation of the CR problem. $v_k$ is included as a column of the basis matrix W because it converges to the eigenvector of the smallest eigenvalue of H.

Results generated by optimization application 122 using different first derivative vectors and different second derivative matrices were compared to results generated using other existing algorithms. The existing algorithms are referred to as NMDCR, LanczosCR, and KrylovCR herein. NMDCR is described in section 6.1 of the Cartis paper. LanczosCR is described in section 6.2 of the Cartis paper in which a Lanczos algorithm is used to a create a new CR problem where the tridiagonal matrix T is used as H, and NMDCR is then used to solve this much simplified problem. The orthogonal matrix Q is then used to recover the solution for the original CR problem. A basic version of the Lanczos method as described in chapter 9 of the book Matrix Computations authored by G. H. Golub and C. F. Van Loan and published by The Johns Hopkins University Press, Baltimore, Maryland, third edition (1996). KrylovCR is described in section 6.2 of the Cartis paper in which the Lanczos algorithm uses the improved version of the Arnoldi method described in a paper titled Partial pivoting in the computation of krylov subspaces of large sparse systems authored by A. Hodel and P. Misra and published in Proceedings of the 42nd IEEE Conference on Decision and Control in December 2003. KrylovCR, which has reorthogonalization implemented, can return better quality solutions than LanczosCR when the Lanczos method fails.

All of the methods including optimization application 122 were implemented using Matlab. NMDCR is used to solve the CR subproblem using optimization application 122, LanczosCR, and KrylovCR. The size of the Krylov subspaces using LanczosCR and KrylovCR was set to 40. The tolerance value E was set to 0.0001. The maximum number of iterations $I_{max}$ was set to 5000. The maximum CPU time value $T_{max}$ was set to 3600 seconds. The number of eigenvectors m was set to 10. The number of smallest eigenvectors $n_{ev}$ was set to 3. The regularization parameter value $\sigma$ was set to 1.

Three sets of test problems were defined to generate the second order derivative matrix H. In all of the test problems, the first order derivative vector g was randomly generated.

For the first set of test problems, the second order derivative matrix H was randomly generated and different matrix sizes were used when executing optimization application 122 and NMDCR. Because NMDCR involves matrix factorization, the size of the test problems was limited to 10,000. For each particular matrix size, 20 randomly generated problems with that size were tested. All of the problems were successfully solved by both NMDCR and optimization application 122. A mean value of the CPU time spent solving the 20 test problems in second is shown in Table 1 below.

TABLE 1

| Matrix size | NMDCR | Optimization application 122 |
|---|---|---|
| 100 | 0.0068 | 0.0022508 |
| 500 | 0.1317 | 0.0148948 |
| 1000 | 0.5654 | 0.0085911 |
| 2000 | 2.3943 | 0.007934 |
| 3000 | 5.2869 | 0.027769 |
| 4000 | 10.4106 | 0.042498 |
| 5000 | 18.9106 | 0.0588668 |
| 6000 | 33.66 | 0.059592 |
| 7000 | 26.8219 | 0.062058 |
| 8000 | 34.1863 | 0.091863 |
| 9000 | 46.9462 | 0.119839 |
| 10000 | 56.945 | 0.1352084 |

Optimization application 122 used significantly less time than NMDCR to solve the same problem with the same results. It is further impractical to apply NMDCR to solve larger problems. Optimization application 122, LanczosCR, and KrylovCR use NMDCR to solve much smaller problems iteratively.

For the second set of test problems, large sparse matrices were selected from the SuiteSparse Matrix Collection described in a paper titled The university of Florida sparse matrix collection authored by Timothy A. Davis and Yifan Hu and published in *ACM Transactions on Mathematical Software* volume 38, issue 1, pp. 1-25 (2011) for each second order derivative matrix H. Second order derivative matrices were randomly selected with sizes between 159,316 and 39,459,925. Some of the second order derivative matrices were positive definite, and some were not. The CPU time in seconds spent solving each test problem is shown in Table 2 below where the problem name is shown in the first column.

TABLE 2

| Problem Name | Matrix size | LanczosCR | KrylovCR | Optimization application 122 |
|---|---|---|---|---|
| apache2 | 715176 | 0.4323 | 19.4560 | 6.8318 |
| Hardesty1 | 938905 | 1.0378 | 25.1975 | 0.6719 |
| iki wiki-talk-temporal | 1140149 | 1.0147 | 33.428 | 11.2384 |
| wiki-topcats | 1791489 | 6.4053 | 53.3988 | 8.618 |
| uk-2005 | 39459925 | 116.7666 | 1311.6247 | 278.0556 |
| nxp1 | 414604 | 0.3558 | 10.6032 | 0.4281 |
| Transport | 1602111 | 1.7103 | 47.7193 | 0.9082 |
| Linux call graph | 324085 | 0.4585 | 8.5869 | 0.5122 |

TABLE 2-continued

| Problem Name | Matrix size | LanczosCR | KrylovCR | Optimization application 122 |
|---|---|---|---|---|
| mycielskian20 | 786431 | 178.0116 | 365.7664 | 477.2339 |
| com-LiveJournal | 3997962 | 11.9573 | 138.7841 | 12.3547 |
| sx-askubuntu | 159316 | 0.1974 | 4.2446 | 0.5355 |
| loc-Gowalla | 196591 | 0.28 | 5.0674 | 0.3669 |

The objective function value at exit is shown in Table 3 below.

TABLE 3

| Problem Name | Matrix size | LanczosCR | KrylovCR | Optimization application 122 |
|---|---|---|---|---|
| apache2 | 715176 | −190.1158 | −190.1158 | −190.1158 |
| Hardesty1 | 938905 | −277.53 | −277.53 | −277.53 |
| iki wiki-talk-temporal | 1140149 | −758.7161 | −758.7171 | −758.7171 |
| wiki-topcats | 1791489 | −397.8158 | −455.1525 | −455.1525 |
| uk-2005 | 39459925 | −107.0696 | −12591.4118 | −12591.4118 |
| nxp 1 | 414604 | −150.9907 | −150.9908 | −150.9908 |
| Transport | 1602111 | −416.3444 | −416.3467 | −416.3467 |
| Linux call graph | 324085 | −125.4718 | −125.4718 | −125.4718 |
| mycielskian20 | 786431 | −44512.1990 | −44514.9243 | −44514.9243 |
| com-LiveJournal | 3997962 | −819.9455 | −819.9455 | −819.9455 |
| sx-askubuntu | 159316 | −73.4993 | −73.5018 | −73.5018 |
| loc-Gowalla | 196591 | −80.6667 | −85.9279 | −85.9279 |

Both optimization application 122 and KrylovCR solved all of the test problems as indicated by the smallest objective function values that were identical for all of the test problems. Though LanczosCR is typically faster, LanczosCR failed to solve the test problems in which the objective function value shown for optimization application 122 and KrylovCR was not achieved. No results are shown using NMDCR because use of NMDCR resulted in computer memory problems. In comparison with KrylovCR, optimization application 122 is significantly faster in solving the same problem resulting in the same objective function value.

For the third set of test problems, each second order derivative matrix H was generated randomly using a penalty function $H=B+4^k J^T J$, where B is a randomly generated 10,000×10,000 symmetrical matrix, J is a randomly generated 1,000×10,000 matrix, and k is an integer having values from 1 to 8. The second order derivative matrices generated in this manner are known to have a bad condition number especially when k is large.

The CPU time in seconds spent solving each test problem is shown in Table 4 below where the problem name is shown in the first column.

TABLE 4

| k | NMDCR | LanczosCR | KrylovCR | Optimization application 122 |
|---|---|---|---|---|
| 1 | 254.741 | 0.262 | 1.168 | 0.478 |
| 2 | 256.165 | 0.266 | 1.292 | 0.542 |
| 3 | 257.464 | 0.341 | 1.291 | 0.583 |
| 4 | 241.968 | 0.291 | 1.279 | 0.536 |
| 5 | 227.726 | 0.261 | 1.280 | 0.790 |
| 6 | 211.858 | 0.404 | 1.361 | 0.739 |
| 7 | 198.519 | 0.310 | 1.294 | 1.096 |
| 8 | 182.881 | 0.277 | 1.286 | 1.370 |

The objective function value at exit is shown in Table 5 below.

TABLE 5

| k | NMDCR, KrylovCR, Optimization application 122 | LanczosCR |
|---|---|---|
| 1 | −3.038 | −0.444 |
| 2 | −3.027 | −0.438 |
| 3 | −3.024 | −0.437 |
| 4 | −3.024 | −0.436 |
| 5 | −3.024 | −0.436 |
| 6 | −3.023 | −0.436 |
| 7 | −3.023 | −0.436 |
| 8 | −3.023 | −0.436 |

Optimization application 122, NMDCR, and KrylovCR solved all of the test problems as indicated by the smallest objective function values that were identical for all of the test problems. Though LanczosCR is always faster, LanczosCR failed to solve the test problems in which the objective function value shown for the other methods was not achieved. In comparison with NMDCR and KrylovCR, optimization application 122 is significantly faster in solving the same problem resulting in the same smallest objective function value.

Figure 3:
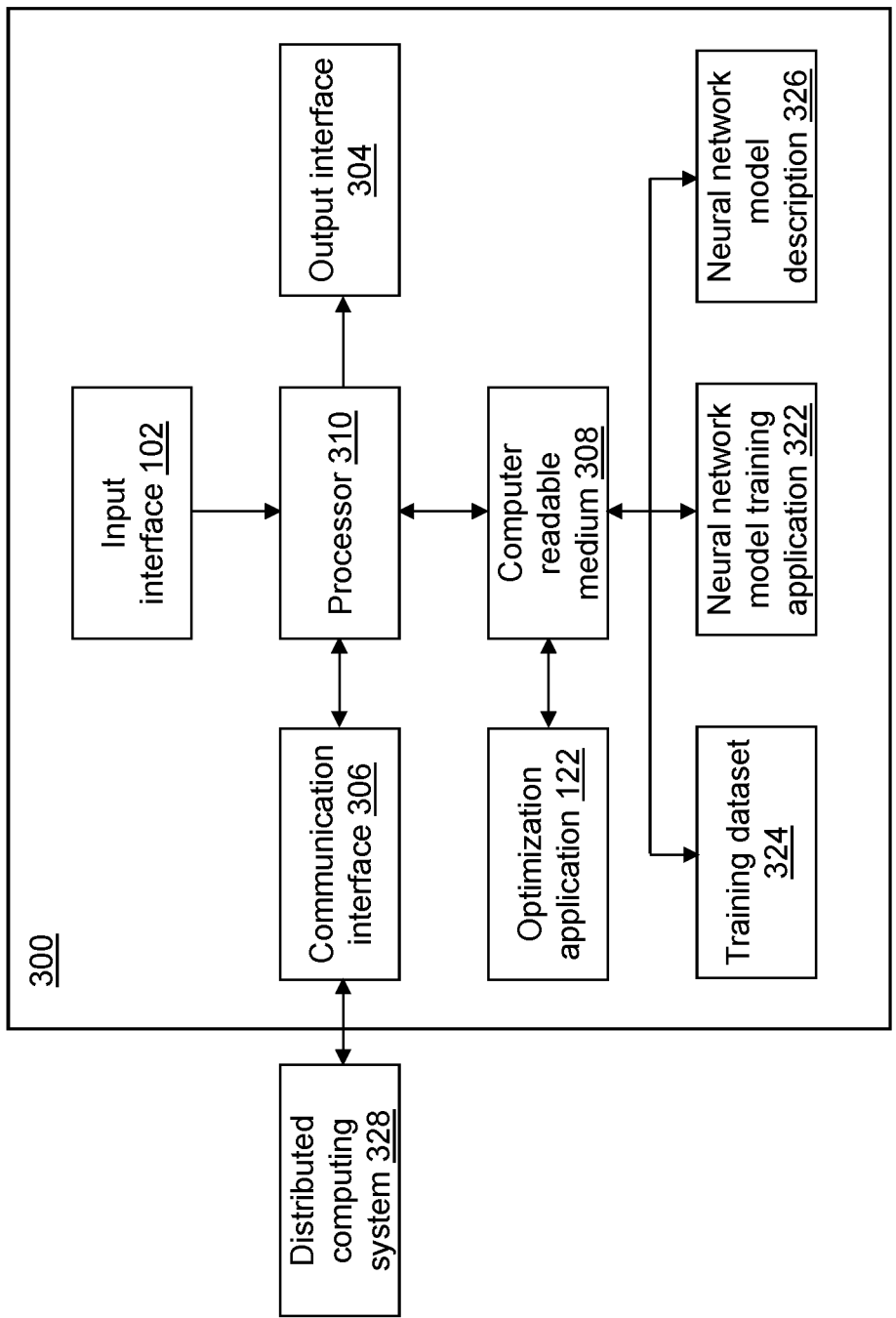
FIG. 3 depicts a block diagram of a neural network model training device in accordance with an illustrative embodiment.

Referring to FIG. 3, a block diagram of a neural network model training device 300 is shown in accordance with an illustrative embodiment. Neural network model training device 300 may include a second input interface 302, a second output interface 304, a second communication interface 306, a second non-transitory computer-readable medium 308, a second processor 310, a neural network model training application 322, a training dataset 324, and a neural network model description 326. Neural network model training application 322 uses the operations of optimization application 122 to compute a search direction. Fewer, different, and/or additional components may be incorporated into neural network model training device 300.

Second input interface 302 provides the same or similar functionality as that described with reference to input interface 102 of optimization device 100 though referring to neural network model training device 300. Second output interface 304 provides the same or similar functionality as that described with reference to output interface 104 of optimization device 100 though referring to neural network model training device 300. Second communication interface 306 provides the same or similar functionality as that described with reference to communication interface 106 of optimization device 100 though referring to neural network model training device 300. Data and messages may be transferred between neural network model training device 300 and a second distributed computing system 328 using third communication interface 506. Distributed computing system 130 and second distributed computing system 328 may be the same or different computing systems. Second computer-readable medium 308 provides the same or similar functionality as that described with reference to computer-readable medium 108 of optimization device 100 though referring to neural network model training device 300. Second processor 310 provides the same or similar functionality as that described with reference to processor 110 of optimization device 100 though referring to neural network model training device 300.

Neural network model training application 322 performs operations associated with defining neural network model description 326 from data stored in training dataset 324. Neural network model description 326 may be used to predict a characteristic value for data stored in training dataset 324 or in a second dataset 524 (shown referring to FIG. 5). The characteristic value may include one or more values that may be a probability that the associated observation vector has a predefined characteristic associated with each probability. Some or all of the operations described herein may be embodied in neural network model training application 322. The operations may be implemented using hardware, firmware, software, or any combination of these methods. Neural network model training application 322 may be implemented as a Web application.

Referring to the example embodiment of FIG. 3, neural network model training application 322 is implemented in software (comprised of computer-readable and/or computer-executable instructions) stored in second computer-readable medium 308 and accessible by second processor 110 for execution of the instructions that embody the operations of neural network model training application 322. Neural network model training application 322 may be written using one or more programming languages, assembly languages, scripting languages, etc. Neural network model training application 322 may be integrated with other analytic tools including optimization application 122. As an example, neural network model training application 322 may be part of an integrated data analytics software application and/or software architecture such as that offered by SAS Institute Inc. of Cary, North Carolina, USA. Merely for illustration, neural network model training application 322 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc.

Training dataset 324 may include, for example, a plurality of rows and a plurality of columns. The plurality of rows may be referred to as observation vectors or records (observations), and the columns may be referred to as variables. In an alternative embodiment, training dataset 324 may be transposed. The plurality of variables defines a vector $x_i$ for each observation vector i=1,2, . . . , N, where N is a number of the observation vectors included in training dataset 324. Training dataset 324 may include additional variables that are not included in the plurality of variables. One or more variables of the plurality of variables may describe a characteristic of a physical object. For example, if training dataset 324 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in training dataset 324 for analysis and processing or streamed to neural network model training device 300 as it is generated. Training dataset 324 may include data captured as a function of time for one or more physical objects. The data stored in training dataset 324 may be captured at different time points periodically, intermittently, when an event occurs, etc. Training dataset 324 may include data captured at a high data rate such as 200 or more observation vectors per second for one or more physical objects. One or more columns of training dataset 324 may include a time and/or date value. Training dataset 324 may include data captured under normal and abnormal operating conditions of the physical object.

The data stored in training dataset 324 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, North Carolina, USA. For example, data stored in training dataset 324 may be generated as part of the Internet of Things (IoT), where things (e.g., machines, devices, phones, sensors) can be connected to networks and the data from these things collected and processed within the things and/or external to the things before being stored in training dataset 324. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 324.

The data stored in training dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Training dataset 324 may be stored on second computer-readable medium 308 or on one or more computer-readable media of second distributed computing system 328 and accessed by neural network model training device 300 using second communication interface 306, second input interface 302, and/or second output interface 304. Training dataset 324 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training dataset 324 may be stored using various data structures as known to those skilled in the art including one or more files of a file system, a relational database, one or more tables of a system of tables, a structured query language database, etc. on neural network model training device 300 or on distributed computing system 130. Neural network model training device 300 may coordinate access to training dataset 324 that is distributed across second distributed computing system 328 that may include one or more computing devices. For example, training dataset 324 may be stored in a cube distributed across a grid of computers as understood by a person of skill in the art. As another example, training dataset 324 may be stored in a multi-node Hadoop® cluster. For instance, Apache™ Hadoop® is an open-source software framework for distributed computing supported by the Apache Software Foundation. As another example, training dataset 324 may be stored in a cloud of computers and accessed using cloud computing technologies, as understood by a person of skill in the art. The SAS® LASR™ Analytic Server may be used as an analytic platform to enable multiple users to concurrently access data stored in training dataset 324. The SAS Viya open, cloud-ready, in-memory architecture also may be used as an analytic platform to enable multiple users to concurrently access data stored in training dataset 324. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 4:
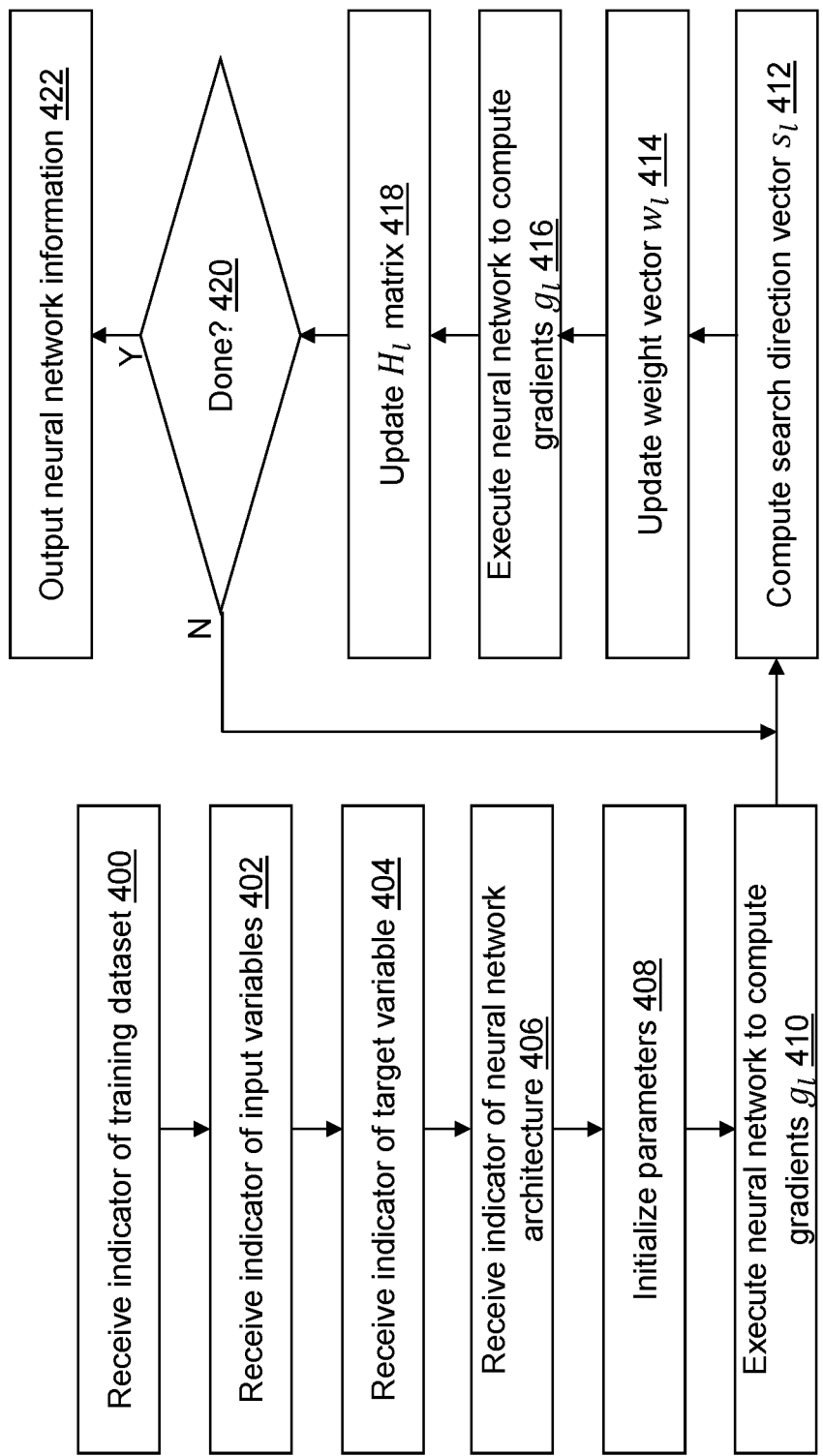
FIG. 4 depicts a flow diagram illustrating examples of operations performed by a neural network model training application of the neural network model training device of FIG. 3 in accordance with an illustrative embodiment.

Referring to FIG. 4, example operations associated with neural network model training application 322 are described. Additional, fewer, or different operations may be performed depending on the embodiment of neural network model training application 322. The order of presentation of the operations of FIG. 4 is not intended to be limiting. Some of the operations may not be performed in some embodiments. Although some of the operational flows are presented in sequence, the various operations may be performed in various repetitions and/or in other orders than those that are illustrated. The operations of neural network model training application 322 further may be performed in parallel using a plurality of threads and/or a plurality of worker computing devices.

Referring to FIG. 4, in an operation 400, a ninth indicator may be received that indicates training dataset 324. For example, the ninth indicator indicates a location and a name of training dataset 324. As an example, the ninth indicator may be received by neural network model training application 322 after selection from a user interface window or after entry by a user into a user interface window. In an alternative embodiment, training dataset 324 may not be selectable. For example, a most recently created dataset may be used automatically.

In an operation 402, a tenth indicator may be received that indicates a plurality of variables or features to include in training a neural network model using training dataset 324. For example, the second indicator may indicate a plurality of column numbers or a plurality of column names. As another option, all of the columns except a last column may be used by default. Each observation vector $x_i$, i=1, . . . , N read from training dataset 324 may include a value for each variable of the plurality of variables to define d dimensions or features. Training dataset 324 includes a set of observation vectors X=[$x_{i,j}$], i=1, . . . , d, j=1, . . . , N. Training dataset 324 may be partitioned or otherwise divided into training, validation, and/or test datasets as part of training a neural network.

In an operation 404, an eleventh indicator may be received that indicates a target variable (column) associated with each observation vector included in training dataset 324 to define a target variable vector $t_i$, i=1, . . . , N. The target variable may be a label for the associated observation vector. For example, the label may indicate a characteristic determined from the observation vector. For example, the eleventh indicator indicates a variable to use by name, column number, etc. In an alternative embodiment, the eleventh indicator may not be received. For example, the last variable in training dataset 324 may be used automatically.

In an operation 406, a twelfth indicator indicates an architecture of a neural network model to be trained to predict a value for the target variable. The twelfth indicator may be received by neural network model training application 322 from a user interface window or after entry by a user into a user interface window. A default value for the architecture may further be stored, for example, in second computer-readable medium 308. For illustration, the architecture defines a plurality of layers and their connectivity including a type of each layer. Illustrative layers include an input layer, a convolution layer, a pooling layer, an output layer, etc. One or more hyperparameters may be defined for each layer that may vary based on the type of each layer. For example, an activation function, a number of neurons, a number of groups, a dropout rate, a height and/or a width of a convolution window, a number of filters, an initialization method for filter weights, width and height padding dimensions, a number of categories or labels, a detection threshold, etc. may be defined as hyperparameters for training the neural network. The architecture may define a convolutional neural network, a deep, fully connected neural network, and/or a recurrent neural network. An automatic tuning method (autotune option) may be specified with one or more values or ranges of values to evaluate for each hyperparameter. The automatic tuning process may be used to identify the best settings for the hyperparameters though the hyperparameters may optionally be selected as an input option by a user. For illustration, a deep learning action set provided as part of SAS® Viya may be used to define, train, and score the neural network model.

In an operation 408, various parameters are initialized for a first execution of the neural network model. For example, initial weights $w_0$ may be defined for each node of the neural network, the neural network training iteration number l may be initialized to one, the Hessian matrix $H_0$ may be initialized, etc.

In an operation 410, the neural network defined by the architecture specified in operation 406 is executed with all or a subset of the observation vectors included in training dataset 124 and the weight vector $w_{l-1}$ to compute gradient vector $g_l$ that includes values for each neuron of the neural network.

In an operation 412, the search direction vector $s_l$ is computed using the operations described in FIGS. 2A and 2B with the gradient vector $g_l$ and the Hessian matrix $H_{l-1}$ as the first order derivative vector and the second order derivative matrix, respectively.

In an operation 414, the weight vector $w_l$ is updated using the search direction vector $s_l$. For example, $w_l = w_{l-1} + ds_l$, where d is a predefined step size that may be defined using various methods known to a person of skill in the art.

In an operation 416, the neural network defined by the architecture specified in operation 406 is executed with all or a subset of the observation vectors included in training dataset 124 and the weight vector $w_l$ to compute gradient vector $g_l$.

In an operation 418, the Hessian matrix $H_l$ is updated using various methods known to a person of skill in the art.

In an operation 420, a determination is made concerning whether processing is done. For example, when a convergence criterion is satisfied or a maximum number of iterations has been executed or a maximum CPU time has been reached, etc. processing may be determined to be done. When processing is done, processing continues in an operation 422. When processing is not done, processing continues in operation 412 to continue to train the neural network model. Prior to the determination, the convergence criterion may be computed using various methods known to a person of skill in the art. Though not show, the neural network training iteration number l may be incremented by one before continuing in operation 412.

In operation 422, a description of the trained neural network model is output. For example, description of the trained neural network model may be output to neural network model description 326. The output neural network model may include the neural network architecture defined in operation 406. For illustration, the trained neural network model may be stored using the ASTORE procedure provided by SAS® Visual Data Mining and Machine Learning software.

Figure 5:
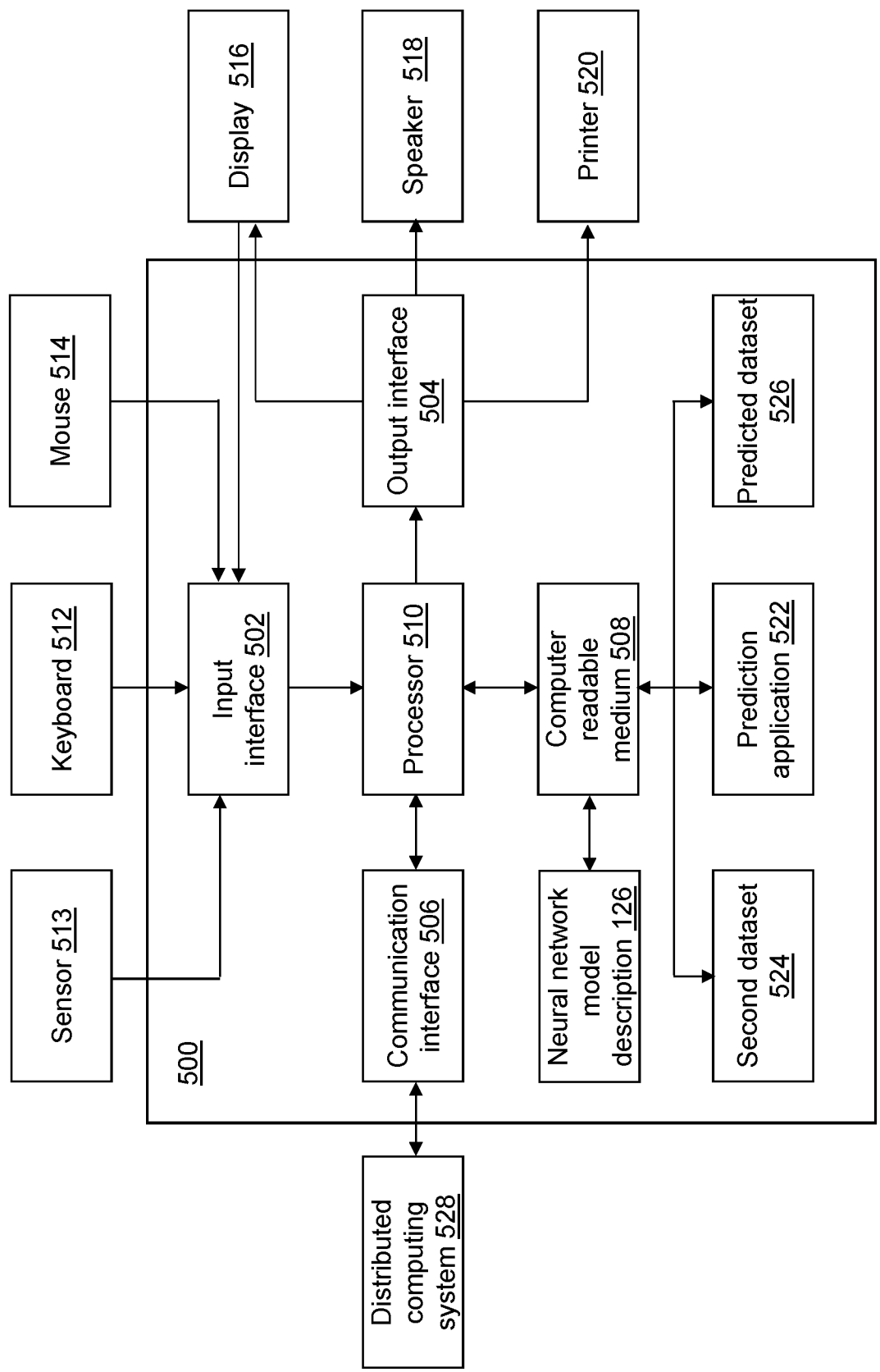
FIG. 5 depicts a block diagram of a prediction device in accordance with an illustrative embodiment.

Referring to FIG. 5, a block diagram of a prediction device 500 is shown in accordance with an illustrative embodiment. Prediction device 500 may include a third input interface 502, a third output interface 504, a third communication interface 506, a third non-transitory computer-readable medium 508, a third processor 510, a prediction application 522, neural network model description 326, second dataset 524, and predicted dataset 526. Fewer, different, and/or additional components may be incorporated into prediction device 500. Prediction device 500, neural network model training device 100, and/or optimization device 100 may be the same or different devices.

Third input interface 502 provides the same or similar functionality as that described with reference to input interface 102 of optimization device 100 though referring to prediction device 500. Third output interface 504 provides the same or similar functionality as that described with reference to output interface 104 of optimization device 100 though referring to prediction device 500. Third communication interface 506 provides the same or similar functionality as that described with reference to communication interface 106 of optimization device 100 though referring to prediction device 500. Data and messages may be transferred between prediction device 500 and a third distributed computing system 528 using third communication interface 506. Distributed computing system 130, second distributed computing system 328, and/or third distributed computing system 528 may be the same or different computing systems. Third computer-readable medium 508 provides the same or similar functionality as that described with reference to computer-readable medium 108 of optimization device 100 though referring to prediction device 500. Third processor 510 provides the same or similar functionality as that described with reference to processor 110 of optimization device 100 though referring to prediction device 500.

Prediction application 522 performs operations associated with classifying or predicting a characteristic value related to each observation vector included in second dataset 524. The predicted characteristic value may be stored in predicted dataset 526 to support various data analysis functions as well as provide alert/messaging related to each prediction that may be a classification. Dependent on the type of data stored in training dataset 324 and second dataset 524, prediction application 522 may identify anomalies as part of process control, for example, of a manufacturing process, for machine condition monitoring, for image classification, for intrusion detection, for fraud detection, for voice recognition, for language translation, etc. Some or all of the operations described herein may be embodied in prediction application 522. The operations may be implemented using hardware, firmware, software, or any combination of these methods.

Referring to the example embodiment of FIG. 5, prediction application 522 is implemented in software (comprised of computer-readable and/or computer-executable instructions) stored in third computer-readable medium 508 and accessible by third processor 510 for execution of the instructions that embody the operations of prediction application 522. Prediction application 522 may be written using one or more programming languages, assembly languages, scripting languages, etc. Prediction application 522 may be integrated with other analytic tools such as neural network model training application 322 and/or optimization application 122. As an example, prediction application 522 may be part of an integrated data analytics software application and/or software architecture such as that offered by SAS Institute Inc. For example, prediction application 522 may be part of SAS® Enterprise Miner™. Merely for further illustration, prediction application 522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, etc.

One or more operations of prediction application 522 further may be performed by an ESPE on an event stream instead of reading observation vectors from second dataset 524. Prediction application 522, neural network model training application 322, and optimization application 122 may be the same or different applications that are integrated in various manners to train a neural network model using training dataset 324 that may be distributed on second distributed computing system 328 and to execute the trained neural network model to predict the characteristic of each observation vector included in second dataset 524 that may be distributed on third distributed computing system 528.

Prediction application 522 may be implemented as a Web application. Prediction application 522 may be integrated with other system processing tools to automatically process data generated as part of operation of an enterprise, to classify data in the processed data, and/or to provide a warning or alert associated with the prediction using third input interface 502, third output interface 504, and/or third communication interface 506 so that appropriate action can be initiated in response. For example, a warning or an alert may be presented using a second display 516, a second speaker 518, a second printer 520, etc. or sent to one or more computer-readable media, display, speaker, printer, etc. of third distributed computing system 528.

Training dataset 324 and second dataset 524 may be generated, stored, and accessed using the same or different mechanisms. The target variable is not defined in second dataset 524. Similar to training dataset 324, second dataset 524 may include a plurality of rows and a plurality of columns with the plurality of rows referred to as observations or records, and the columns referred to as variables that are associated with an observation. Second dataset 524 may be transposed.

Similar to training dataset 324, second dataset 524 may be stored on third computer-readable medium 508 or on one or more computer-readable media of third distributed computing system 528 and accessed by prediction device 500 using third communication interface 506. Data stored in second dataset 524 may be a sensor measurement or a data communication value, for example, from a sensor 513, may be generated or captured in response to occurrence of an event or a transaction, generated by a device such as in response to an interaction by a user with the device, for example, from a second keyboard 512 or a second mouse 514, etc. The data stored in second dataset 524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 524 may be captured at different time points periodically, intermittently, when an event occurs, etc. One or more columns may include a time value. Similar to training dataset 324, data stored in second dataset 524 may be generated as part of the IoT, and some or all data may be pre- or post-processed by an ESPE.

Similar to training dataset 324, second dataset 524 may be stored in various compressed formats such as a coordinate format, a compressed sparse column format, a compressed sparse row format, etc. Second dataset 524 further may be stored using various structures as known to those skilled in the art including a file system, a relational database, a system of tables, a structured query language database, etc. on prediction device 500 and/or on third distributed computing system 528. Prediction device 500 may coordinate access to second dataset 524 that is distributed across a plurality of computing devices that make up third distributed computing system 528. For example, second dataset 524 may be stored in a cube distributed across a grid of computers as understood by a person of skill in the art. As another example, second dataset 524 may be stored in a multi-node Hadoop® cluster. As another example, second dataset 524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 524.

Figure 6:
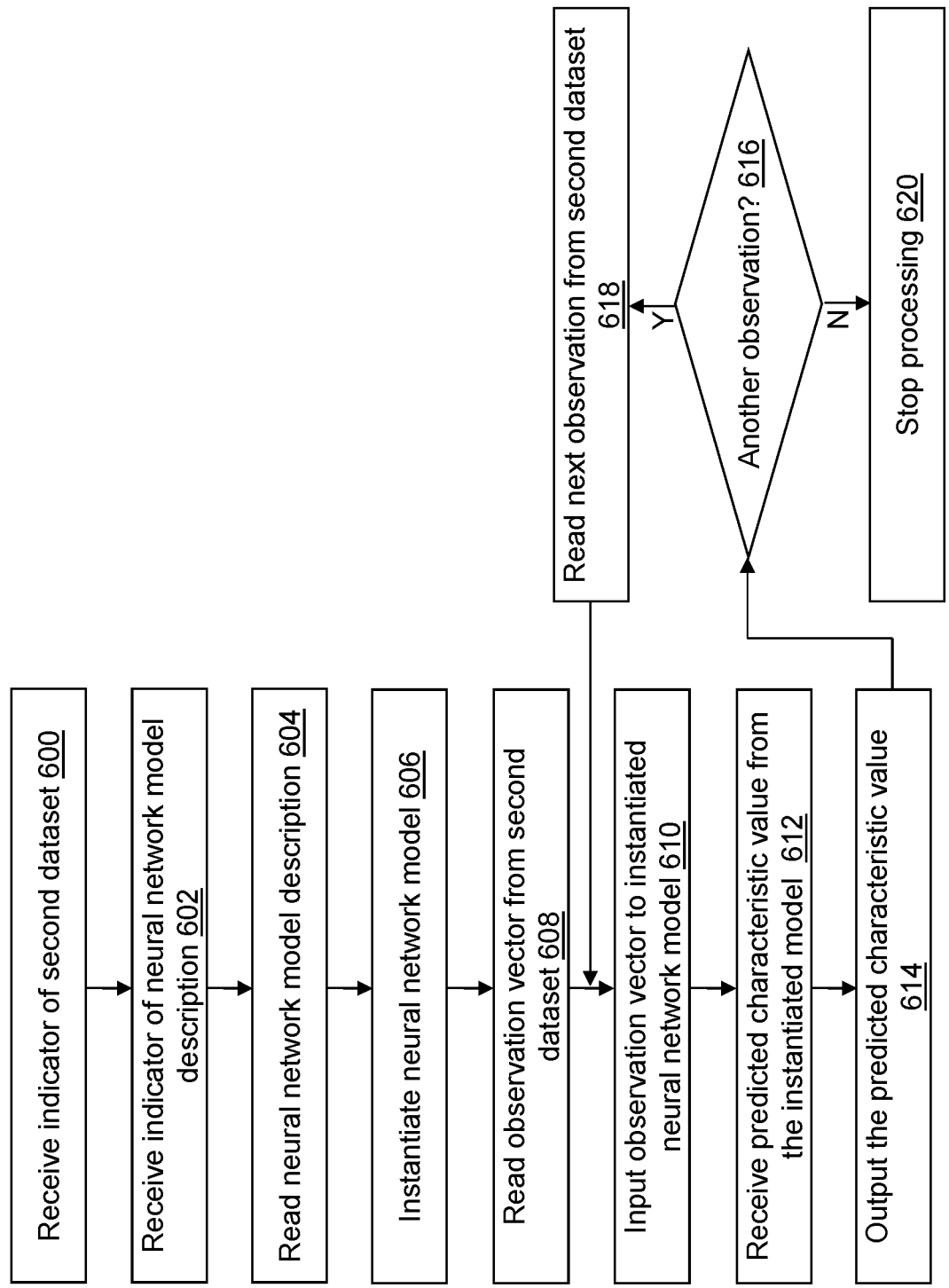
FIG. 6 depicts a flow diagram illustrating examples of operations performed by the prediction device of FIG. 5 in accordance with an illustrative embodiment.

Referring to FIG. 6, example operations of prediction application 522 are described. Additional, fewer, or different operations may be performed depending on the embodiment of prediction application 522. The order of presentation of the operations of FIG. 6 is not intended to be limiting. Although some of the operational flows are presented in sequence, the various operations may be performed in various repetitions, concurrently (in parallel, for example, using threads and/or third distributed computing system 528), and/or in other orders than those that are illustrated.

In an operation 600, a thirteenth indicator may be received that indicates second dataset 524. For example, the thirteenth indicator indicates a location and a name of second dataset 524. As an example, the thirteenth indicator may be received by prediction application 522 after selection from a user interface window or after entry by a user into a user interface window. In an alternative embodiment, second dataset 524 may not be selectable. For example, a most recently created dataset may be used automatically.

In an operation 602, a fourteenth indicator may be received that indicates neural network model description 326. For example, the fourteenth indicator indicates a location and a name of neural network model description 326. As an example, the fourteenth indicator may be received by prediction application 522 after selection from a user interface window or after entry by a user into a user interface window. In an alternative embodiment, neural network model description 326 may not be selectable. For example, a most recently created model configuration data may be used automatically. As another example, neural network model description 326 may be provided automatically as part of integration with neural network model training application 322.

In an operation 604, a neural network model description is read from neural network model description 326.

In an operation 606, a neural network model is instantiated with the neural network model description. For example, the architecture of the neural network model, its hyperparameters, its weight vector, and other characterizing elements are read and used to instantiate a neural network model based on the information output from the training process in operation 422.

In an operation 608, an observation vector is read from second dataset 524.

In an operation 610, the observation vector is input to the instantiated model.

In an operation 612, a predicted characteristic value for the read observation vector is received as an output of the instantiated model. The output may include a probability that the observation vector has one or more different possible characteristic values.

In an operation 614, the predicted characteristic value may be output, for example, by storing the predicted characteristic value with the observation vector to predicted dataset 526. In addition, or in the alternative, the predicted characteristic value may be presented on second display 516, printed on second printer 520, sent to another computing device using third communication interface 506, an alarm or other alert signal may be sounded through second speaker 518, etc.

In an operation 616, a determination is made concerning whether or not second dataset 524 includes another observation vector. When second dataset 524 includes another observation vector, processing continues in an operation 618. When second dataset 524 does not include another observation vector, processing continues in an operation 620.

In operation 618, a next observation vector is read from second dataset 524, and processing continues in operation 610.

In operation 620, processing stops.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    (A) perform a conjugate gradient (CG) iteration with a predefined first order derivative vector and a predefined second order derivative matrix, wherein performance of the conjugate gradient iteration updates a CG residual vector, an H-conjugate vector, and a residual weight vector;
(B) update a CG solution vector using a previous CG solution vector, the updated H-conjugate vector, and the updated residual weight vector;
(C) compute an eigenvector of the predefined second order derivative matrix that has a smallest eigenvalue relative to other eigenvalues of other eigenvectors of the predefined second order derivative matrix;
(D) define a basis matrix that includes a previous cubic regularization (CR) solution vector, a previous CR residual vector, the updated CG solution vector, the updated CG residual vector, and the computed eigenvector;
(E) perform a CR iteration to update the previous CR solution vector using the defined basis matrix;
(F) update the previous CR residual vector using the predefined first order derivative vector, the predefined second order derivative matrix, and the updated previous CR solution vector;
(G) repeat (A) through (F) until a stop criterion is satisfied, wherein, on a next iteration of (A) through (F), the previous CG solution vector is the updated CG solution vector, the previous CR residual vector is the updated previous CR residual vector, and the previous CR solution vector is the updated previous CR solution vector; and
output the updated previous CR solution vector for use in solving a nonlinear optimization problem.

2. The non-transitory computer-readable medium of claim 1, wherein the updated previous CR solution vector is a search direction vector for use in training a neural network model.

3. The non-transitory computer-readable medium of claim 2, wherein the computer-readable instructions further cause the computing device to:
train the neural network model to optimize a predefined loss function using the search direction vector.

4. The non-transitory computer-readable medium of claim 3, wherein the computer-readable instructions further cause the computing device to:
read an observation vector from a dataset;
execute the trained neural network model with the read observation vector to predict an outcome value for the read observation vector; and
output the predicted outcome value for the read observation vector.

5. The non-transitory computer-readable medium of claim 1, wherein the updated previous CR solution vector is an estimated parameter for use in maximizing a likelihood function.

6. The non-transitory computer-readable medium of claim 5, wherein the likelihood function is predefined to compute a mixed model solution.

7. The non-transitory computer-readable medium of claim 5, wherein the likelihood function is predefined to compute a logistic regression solution.

8. The non-transitory computer-readable medium of claim 5, wherein the likelihood function is predefined to compute a state space model solution.

9. The non-transitory computer-readable medium of claim 5, wherein the likelihood function is predefined to compute a solution vector for an autoregressive moving average process.

10. The non-transitory computer-readable medium of claim 1, wherein the CG iteration executes a Lanczos algorithm.

11. The non-transitory computer-readable medium of claim 1, wherein, after (B) and before (C), the computer-readable instructions further cause the computing device to:
determine whether a CG solution is found;
when the CG solution is found, skip (C) through (G) and output the updated CG solution vector for use in solving the nonlinear optimization problem.

12. The non-transitory computer-readable medium of claim 11, wherein the CG solution is found when $\|\hat{r}\| \leq 0.5 \in \|g\|$, where $\hat{r}$ indicates the updated CG residual vector, $\in$ indicates a predefined tolerance value, g indicates the predefined first order derivative vector, and $\| \|$ indicates a Euclidean norm computation.

13. The non-transitory computer-readable medium of claim 11, wherein the CG solution is found when $\|\hat{r}\| \leq 0.5 \in \|g\|$ and $\|\lambda - \sigma\|\hat{s}\|\|\|\hat{s}\| \leq 0.5 \in \|g\|$, where $\hat{r}$ indicates the updated CG residual vector, E indicates a predefined tolerance value, g indicates the predefined first order derivative vector, $\| \|$ indicates a Euclidean norm computation, $\lambda = \sigma\|s_0\|$, a indicates a predefined regularization parameter value, s indicates the updated CG solution vector, and so indicates a predefined initial CR solution vector.

14. The non-transitory computer-readable medium of claim 11, wherein the CG solution is found when $\|\hat{r}\| \leq 0.5 \in \|g\|$ and $\|\lambda - \sigma\|\hat{s}\|\|\|\hat{s}\| \leq 0.5 \in \|g\|$, where $\hat{r}$ indicates the updated CG residual vector, $\in$ indicates a predefined tolerance value, g indicates the predefined first order derivative vector, $\| \|$ indicates a Euclidean norm computation, $\lambda = \sigma\|s\|$, $\sigma$ indicates a predefined regularization parameter value, s indicates the updated CG solution vector, and s indicates a previous CR solution vector.

15. The non-transitory computer-readable medium of claim 1, wherein the stop criterion is satisfied when (G) is performed a predefined maximum number of times.

16. The non-transitory computer-readable medium of claim 1, wherein the stop criterion is satisfied when $\|r\| \leq \in \|g\|$, where r indicates the updated previous CR residual vector, $\in$ indicates a predefined tolerance value, g indicates the predefined first order derivative vector, and $\| \|$ indicates a Euclidean norm computation.

17. The non-transitory computer-readable medium of claim 1, wherein, after (E) and before (F), the computer-readable instructions further cause the computing device to:
determine whether to restart a CG process;
when the CG process is restarted, update the updated CG solution vector to be equal to the updated previous CR solution vector.

18. The non-transitory computer-readable medium of claim 17, wherein, when the CG process is restarted, reset the updated CG residual vector.

19. The non-transitory computer-readable medium of claim 18, wherein the updated CG residual vector is reset using $\hat{r} = -(H + \lambda I)\hat{s} - g$, where $\hat{r}$ indicates the updated CG residual vector, H indicates the predefined second order derivative matrix, $\lambda = \sigma\|s\|$, $\sigma$ indicates a predefined regularization parameter value, s indicates the updated previous CR solution vector, I indicates an identity matrix having a same dimension as the predefined second order derivative matrix, s indicates the updated CG solution vector, and g indicates the predefined first order derivative vector.

20. The non-transitory computer-readable medium of claim 17, wherein the CG process is restarted when $p^T(H + \lambda I)p \leq 0$, where p indicates the updated H-conjugate vector, T indicates a transpose, H indicates the predefined second order derivative matrix, $\lambda=\sigma\|s_0\|$, a indicates a predefined regularization parameter value, $s_0$ indicates a predefined initial CR solution vector, and I indicates an identity matrix having a same dimension as the predefined second order derivative matrix.

21. The non-transitory computer-readable medium of claim 17, wherein the CG process is restarted when $p^T(H+\lambda I)p\leq 0$, where p indicates the updated H-conjugate vector, T indicates a transpose, H indicates the predefined second order derivative matrix, $\lambda=\sigma\|s\|$, $\sigma$ indicates a predefined regularization parameter value, s indicates the updated previous CR solution vector, and I indicates an identity matrix having a same dimension as the predefined second order derivative matrix.

22. The non-transitory computer-readable medium of claim 17, wherein the CG process is restarted when $\|\hat{r}\|\leq\in\|g\|$, where $\hat{r}$ indicates the updated CG residual vector, $\in$ indicates a predefined tolerance value, g indicates the predefined first order derivative vector, and $\|\ \|$ indicates a Euclidean norm computation.

23. The non-transitory computer-readable medium of claim 17, wherein, after (B) and before (C), the computer-readable instructions further cause the computing device to:
    determine whether a CG solution is found;
    when the CG solution is found, skip (C) through (G) and output the updated CG solution vector for use in solving the nonlinear optimization problem.

24. The non-transitory computer-readable medium of claim 23, wherein, when the CG process is restarted, $\lambda=\sigma\|s\|$, $\sigma$ indicates a predefined regularization parameter value, $\|\ \|$ indicates a Euclidean norm computation, and s indicates the updated previous CR solution vector.

25. The non-transitory computer-readable medium of claim 24, wherein, the CG solution is found when $\|\hat{r}\|\leq 0.5\in\|g\|$ and $\|\lambda-\sigma\|\hat{s}\|\|\|\hat{s}\|\leq 0.5\in\|g\|$, where $\hat{r}$ indicates the updated CG residual vector, E indicates a predefined tolerance value, g indicates the predefined first order derivative vector, and $\hat{s}$ indicates the updated CG solution vector.

26. The non-transitory computer-readable medium of claim 1, wherein defining the basis matrix comprises:
    defining a first matrix by stacking the previous CR solution vector, the previous CR residual vector, the updated CG solution vector, the updated CG residual vector, and the computed eigenvector in successive columns of the first matrix; and
    computing a singular value decomposition of the defined first matrix to compute $U\Sigma V^T$, where U indicates a first unitary matrix, $\Sigma$ indicates a rectangular diagonal matrix, V indicates a second unitary matrix having dimension of 5×5, and T indicates a transpose,
    where the basis matrix is the second unitary matrix.

27. The non-transitory computer-readable medium of claim 1, wherein, when $\|\hat{r}\|>\in\|g\|$, defining the basis matrix comprises:
    defining a first matrix by stacking the previous CR solution vector, the updated CG solution vector, the updated CG residual vector, and the computed eigenvector in successive columns of the first matrix; and
    computing a singular value decomposition of the defined first matrix to compute $U\Sigma V^T$, where U indicates a first unitary matrix, $\Sigma$ indicates a rectangular diagonal matrix, V indicates a second unitary matrix having dimension of 4×4, and T indicates a transpose,
    where the basis matrix is the second unitary matrix, $\hat{r}_k$ indicates the updated CG residual vector, $\in$ indicates a predefined tolerance value, g indicates the predefined first order derivative vector, and $\|\ \|$ indicates a Euclidean norm computation.

28. The non-transitory computer-readable medium of claim 1, wherein the previous CR residual vector is updated using $r=-(H+\sigma\|s\|I)s-g$, where H indicates the predefined second order derivative matrix, $\sigma$ indicates a predefined regularization parameter value, s indicates the updated previous CR solution vector, $\|\ \|$ indicates a Euclidean norm computation, I indicates an identity matrix having a same dimension as the predefined second order derivative matrix, and g indicates the predefined first order derivative vector.

29. A computing device comprising:
    a processor; and
    a computer-readable medium operably coupled to the processor, the computer-readable medium having computer-readable instructions stored thereon that, when executed by the processor, cause the computing device to
    (A) perform a conjugate gradient (CG) iteration with a predefined first order derivative vector and a predefined second order derivative matrix, wherein performance of the conjugate gradient iteration updates a CG residual vector, an H-conjugate vector, and a residual weight vector;
    (B) update a CG solution vector using a previous CG solution vector, the updated H-conjugate vector, and the updated residual weight vector;
    (C) compute an eigenvector of the predefined second order derivative matrix that has a smallest eigenvalue relative to other eigenvalues of other eigenvectors of the predefined second order derivative matrix;
    (D) define a basis matrix that includes a previous cubic regularization (CR) solution vector, a previous CR residual vector, the updated CG solution vector, the updated CG residual vector, and the computed eigenvector;
    (E) perform a CR iteration to update the previous CR solution vector using the defined basis matrix;
    (F) update the previous CR residual vector using the predefined first order derivative vector, the predefined second order derivative matrix, and the updated previous CR solution vector;
    (G) repeat (A) through (F) until a stop criterion is satisfied, wherein, on a next iteration of (A) through (F), the previous CG solution vector is the updated CG solution vector, the previous CR residual vector is the updated previous CR residual vector, and the previous CR solution vector is the updated previous CR solution vector; and
    output the updated previous CR solution vector for use in solving a nonlinear optimization problem.

30. A method of determining a solution to a nonlinear optimization problem, the method comprising:
    (A) performing, by a computing device, a conjugate gradient (CG) iteration with a predefined first order derivative vector and a predefined second order derivative matrix, wherein performance of the conjugate gradient iteration updates a CG residual vector, an H-conjugate vector, and a residual weight vector;
    (B) updating, by the computing device, a CG solution vector using a previous CG solution vector, the updated H-conjugate vector, and the updated residual weight vector;
    (C) computing, by the computing device, an eigenvector of the predefined second order derivative matrix that has a smallest eigenvalue relative to other eigenvalues of other eigenvectors of the predefined second order derivative matrix;

(D) defining, by the computing device, a basis matrix that includes a previous cubic regularization (CR) solution vector, a previous CR residual vector, the updated CG solution vector, the updated CG residual vector, and the computed eigenvector;

(E) performing, by the computing device, a CR iteration to update the previous CR solution vector using the defined basis matrix;

(F) updating, by the computing device, the previous CR residual vector using the predefined first order derivative vector, the predefined second order derivative matrix, and the updated previous CR solution vector;

(G) repeating, by the computing device, (A) through (F) until a stop criterion is satisfied, wherein, on a next iteration of (A) through (F), the previous CG solution vector is the updated CG solution vector, the previous CR residual vector is the updated previous CR residual vector, and the previous CR solution vector is the updated previous CR solution vector; and outputting, by the computing device, the updated previous CR solution vector for use in solving a nonlinear optimization problem.

* * * * *

UNITED STATES PATENT AND TRADEMARK OFFICE
CERTIFICATE OF CORRECTION

PATENT NO. : 11,983,631 B1
APPLICATION NO. : 18/511092
DATED : May 14, 2024
INVENTOR(S) : Wenwen Zhou et al.

It is certified that error appears in the above-identified patent and that said Letters Patent is hereby corrected as shown below:

In the Specification

Column 7, Line 38:
Delete the phrase "E" and replace with -- $\epsilon$ --.

Column 7, Line 42:
Delete the phrase "E" and replace with -- $\epsilon$ --.

Column 7, Line 44:
Delete the phrase "E" and replace with -- $\epsilon$ --.

Column 7, Line 46:
Delete the phrase "E" and replace with -- $\epsilon$ --.

Column 11, Line 65:
Delete the phrase "E" and replace with -- $\epsilon$ --.

In the Claims

Claim 13, Column 24, Line 20:
Delete the phrase "vector, E indicates" and replace with -- vector, $\epsilon$ indicates --.

Claim 13, Column 24, Lines 23:
Delete the phrase "a indicates" and replace with -- $\sigma$ indicates --.

Claim 13, Column 24, Lines 23-24:
Delete the phrase "s indicates the updated CG solution vector, and so indicates" and
replace with -- $\hat{s}$ indicates the updated CG solution vector, and $s_0$ indicates --.

Signed and Sealed this
Twelfth Day of November, 2024

Katherine Kelly Vidal
*Director of the United States Patent and Trademark Office*

Claim 14, Column 24, Line 32:
Delete the phrase "value, s" and replace with -- value, $\hat{s}$ --.

Claim 19, Column 24, Line 62:
Delete the phrase "s indicates" and replace with -- $\hat{s}$ indicates --.

Claim 20, Column 25, Line 1:
Delete the phrase "a indicates" and replace with -- $\sigma$ indicates --.

Claim 27, Column 25, Line 55:
Delete the phrase "$\|\hat{r}\| > \epsilon\|g\|$" and replace with -- $\|\hat{r}_k\| > \epsilon\|g\|$ --.